United States Patent [19]

Smallwood et al.

[11] 4,446,287

[45] May 1, 1984

[54] PRODUCTION OF VINYL CHLORIDE POLYMERS

[75] Inventors: Peter V. Smallwood; Erno L. Zichy, both of Hertfordshire, England

[73] Assignee: Imperial Chemical Industries PLC, London, England

[21] Appl. No.: 397,351

[22] Filed: Jul. 12, 1982

[30] Foreign Application Priority Data

Jul. 20, 1981 [GB] United Kingdom ............... 8122306

[51] Int. Cl.$^3$ .............................................. C08F 2/24
[52] U.S. Cl. ..................................... 526/81; 526/344.2
[58] Field of Search ............................... 526/81, 344.2

[56] References Cited

U.S. PATENT DOCUMENTS

| | | | |
|---|---|---|---|
| 3,671,508 | 6/1972 | Koyanagi et al. | 526/344.2 |
| 3,706,705 | 12/1972 | Koyanagi et al | 526/344.2 |
| 3,716,507 | 2/1973 | Glomski et al. | 526/344.2 |
| 4,143,224 | 3/1979 | Klippert et al. | 526/344.2 |
| 4,283,516 | 8/1981 | Peeples | 526/344.2 |
| 4,324,878 | 4/1982 | Biaggi et al. | 526/344.2 |
| 4,330,653 | 5/1982 | Klippert et al. | 526/344.2 |

FOREIGN PATENT DOCUMENTS

| | | |
|---|---|---|
| W8235 | of 1955 | Fed. Rep. of Germany . |
| 138550 | 11/1979 | German Democratic Rep. . |
| 1381970 | 2/1964 | France . |
| 55-5908 | 1/1980 | Japan . |
| 699016 | 10/1953 | United Kingdom . |
| 1052871 | 12/1966 | United Kingdom . |
| 1565626 | 4/1980 | United Kingdom . |

OTHER PUBLICATIONS

Zhurnal Prikhadnoi, Khimii, vol. 50, No. 2, pp. 373–377, Feb., 1977.

*Primary Examiner*—Stanford M. Levin
*Attorney, Agent, or Firm*—Cushman, Darby & Cushman

[57] ABSTRACT

Production of vinyl chloride polymer of high porosity by polymerizing vinyl chloride in aqueous suspension and injecting an effective surfactant at a monomer to polymer conversion within the range 15 to 65%. An effective surfactant is found to be one which lowers the interfacial tension between 1,2-dichloroethylene and water to $\leq 8$ dynes cm$^{-1}$.

5 Claims, No Drawings

PRODUCTION OF VINYL CHLORIDE POLYMERS

The present invention relates to a process for the production of vinyl chloride polymers by polymerisation in aqueous suspension.

It is well known to produce vinyl chloride polymers by polymerisation in aqueous suspension using a monomer-soluble free-radical yielding initiator and a protective colloid as suspension agent, the polymeric product produced being in granular form. In many cases, however, the particles of the granular product so produced could advantageously possess a significantly greater porosity. For example, in many instances the polymer possesses an insufficient capacity to absorb plasticiser.

One approach to the solution of this problem is to modify the suspension agent system that is present in the polymerisation medium at or just after the start of polymerisation, usually by employing one or more other substances in addition to the conventionally-used suspension agent. For example, it is known to use a mixture of a protective colloid, such as a partially hydrolysed polyvinyl acetate or a cellulose derivative, and a surfactant, as the suspension agent system in order to produce a porous vinyl chloride polymer by polymerisation in aqueous suspension. It is also known to use a mixture of two different types of protective colloid as the suspension agent system, for example a mixture of a partially hydrolysed polyvinyl acetate and a cellulose derivative or a mixture of partially hydrolysed polyvinyl acetates of differing degrees of hydrolysis.

While such methods are often effective for increasing particle porosity, we have found that the improvement in porosity of the resulting polymer is often achieved at the expense of other properties, and in particular the granulometry of the polymer is often adversly affected. For example, an increase in the particle porosity is very often accompanied by an unacceptable increase or decrease in mean granule size and/or granule size spread, and it is often very difficult and sometimes impossible to find polymerisation conditions such that the required granulometry is regained.

We have now invented an effective process for the production of granular vinyl chloride polymers of significantly improved porosity whereby the product obtained does not incur an undesirable deterioration in granulation-dependent properties such as mean granule size and granule size spread. Moreover, the product formed by this process often has a significantly improved capacity for absorbing plasticiser in comparison to granular vinyl chloride polymers of improved porosity prepared by prior art processes which use a modified suspension agent system.

According to the present invention there is provided a process for the production of a vinyl chloride polymer of high porosity and plasticiser absorption capacity which process comprises polymerising vinyl chloride in aqueous supension in the presence of a suspension agent that is present in the polymerisation medium at the start of polymerisation and a free-radical yielding initiator wherein an effective surfactant is injected into the polymerisation medium at a conversion of monomer to polymer within the range 15 to 65%.

Thus in the process according to the invention, a surfactant (by which we mean a single surfactant or a combination of surfactants) is injected at a monomer to polymer conversion of 15 to 65%. Injection before a conversion of 15% tends to adversely affect granulation, while injection after 65% conversion usually fails to impart a significant increase in polymer porosity. Preferably, injection is effected at a monomer to polymer conversion within the range 15 to 55% particularly 20 to 55%

Not all surfactants are effective in the process of the invention and those which do impart increased porosity (i.e. effective surfactants) should be selected by trial experiments. As a result of our own experimentation, we have concluded thus far that it is those surfactants which significantly reduce the vinyl chloride/water interfacial tension at the intended polymerisation temperature which provide a polymer of enhanced porosity, greatly increased plasticiser absorption capacity, and unaffected granulometry when employed according to the invention. However, since the measurement of the vinyl chloride/water interfacial tension is experimentally difficult to carry out, we have employed the measurement of the interfacial tension between 1,2-dichloroethylene (EDC) and water ($\gamma$EDC/water) as affected by the surfactant to provide an indication of surfactant effectiveness (EDC acting as a model compound for vinyl chloride). This is a much easier measurement to determine and moreover there appears thus far to be an excellent correlation between surfactant effectiveness and $\gamma$EDC/water. We have in fact found thus far that those surfactants which lower $\gamma$EDC/water to $\leq 8$ dynes cm$^{-1}$ (as measured at 20° C. on an aqueous surfactant solution containing 0.1% w/v of surfactant) are effective in the process of the invention.

The quantity of surfactant which may be employed is not particularly critical. Generally speaking, an amount within the range 0.005 to 0.3%, particularly 0.02 to 0.2%, by weight based on the weight of monomer used, may be used in the process of the invention. It is therefore seen that very small quantities of surfactant injected according to the process of the invention are effective in significantly enhancing polymer porosity.

Examples of injected surfactants which are effective in the process of the invention are:

'Tal' 160T, believed to be a mixture of mono- and di-glycerides of sucrose with an alkyl chain length of C16-C18.

'Synperonic' RA00/80, an ethoxylated octyl alcohol/formaldehyde condensate.

'Nansa' 1260, sodium dodecyl benzene sulphonate.

'Synprolam' 35X2/HCl, C13-15 fatty amine ethoxylate neutralized with HCl.

'Cetavlon', cetyl trimethyl ammonium bromide.

Examples of injected surfactants which are not effective in the process of the invention are:

'Synperonic' NP13 and NP20, nonyl phenol ethoxylate.

'Synperonic' All, C13-C15 alcohol ethoxylate mixture.

'Tetronic' 707, polyoxyalkylene glycol/polyamine condensate.

'Fluorad' FC 126, ammonium perfluorooctanoate.

The values of interfacial tension between EDC and water ($\gamma$EDC/water) as affected by the above surfactants are given in Table 1. Each measurement of interfacial tension was made at 20° C. (room temperature) using a Du Nouy Tensiometer by spreading a layer of the aqueous surfactant solution (containing 0.1% by weight of surfactant) onto EDC.

TABLE 1

| Surfactant | γEDC/water (dynes/cm$^{-1}$) |
|---|---|
| — | 27 |
| 'Nansa' 1260 | 2.5 |
| 'Synperonic' RA00/80 | 3.5 |
| 'Tal' 160T | 2.5 |
| 'Synprolam' 35 × 2/HCl | 7 |
| 'Cetavlon' | 7.5 |
| 'Synperonic' NP13 or NP20 | 17.5 |
| 'Synperonic' A11 | 15 |
| 'Fluorad' FC 126 | 22 |
| 'Tetronic' 707 | 9.5 |

The suspension agent employed in the process of the invention is normally one or more of those used generally for the polymerisation of vinyl chloride in aqueous suspension. Examples of these include protective colloids such as partially hydrolysed polyvinyl acetate, gelatin, polyvinyl pyrrolidone, and cellulose derivatives, e.g. methyl cellulose, carboxymethyl cellulose and hydroxyethyl cellulose. The suspension agent may be used in a conventional quantity—generally speaking from 0.01 to 1% by weight calculated on monomer weight.

Any suitable free-radical yielding polymerisation initiator that is monomer-soluble may be used in the process of the present invention. Examples of these include peroxy compounds such as di-tertiarybutyl peroxide, acyl peroxides such as lauroyl peroxide and acetyl cyclohexyl sulphonyl peroxide, peresters such as tertiarybutyl peroctoate, percarbonates, azo compounds such as azo-bis-isobutyronitrile and 2,2'-azo-bis-2,4-dimethyl-valeronitrile and boron alkyls. Monomer-soluble free-radical yielding polymerisation initiators that are particularly suitable for use in an polymerisation process according to the invention are the dialkyl or dicycloalkyl peroxydicarbonates whose alkyl or cycloalkyl radicals contain up to 20 carbon atoms, such as diethyl peroxydicarbonate, di-isopropyl peroxydicarbonate, dicetyl peroxydicarbonate, and di(tertiarybutyl cyclohexyl)peroxydicarbonate, and azo compounds such as 2,2-azo-bis-2,4-dimethyl-valeronitrile and azo-bis-isobutyronitrile. These initiators may be used in conventional quantities—generally speaking from 0.01 to 1% by weight calculated on monomer weight.

By the "polymerisation" of vinyl chloride is meant both the homopolymerisation of vinyl chloride and the copolymerisation of vinyl chloride with one or more comonomers copolymerisable therewith. Examples of the latter include vinyl esters such as vinyl acetate, acrylic esters such as methyl acrylate and butyl methacrylate, acrylic nitriles such as acrylonitrile and methacrylonitrile, unsaturated diesters such as diethyl maleate, allyl esters such as allyl acetate, α-olefins such as ethylene and propylene, vinyl esthers and styrene compounds. It is preferable to apply the process of the invention to the production of polymers containing at least 50% molar and more particularly at least 80% molar of units derived from vinyl chloride.

The operating conditions for polymerisation according to the present invention may be those customarily used for vinyl chloride polymerisation, the polymerisation temperature generally being between 40° and 75° C. and the pressure generally being below 15 kg/cm$^2$.

The present invention is now illustrated by the following Examples (the prefix C for an Example denotes a comparative Example). Unless otherwise specified, all parts and percentages are by weight. EXAMPLES C1, 2, C3 TO C6, 7TO 9, C10, 11 C12 TO C14

These Examples all employed the same vinyl chloride homopolymerisation in aqueous suspension, using the following basic recipe:

| | |
|---|---|
| vinyl chloride | 55.3 kg |
| demineralised water | 75 liters |
| diethyl peroxydicarbonate (initiator) | 0.03% based on monomer |
| partially hydrolysed polyvinyl acetate; 72 mole % hydrolysis (suspension agent) | 0.12% based on monomer (added before start of polymerisation) |

The polymersations were carried out at a polymerisation temperature of 57° C. and continued to about 90% conversion before venting. The resulting polymer slurries were dewatered and dried. In some of the polymerisations, surfactants were injected between 15 and 65% conversion.

The details of the polymersations and the resulting polymer properties are shown in Table 2.

TABLE 2

| | Injected Surfactant | | | Polymer Properties | | |
|---|---|---|---|---|---|---|
| | | | | | Granule size | Cold |
| Ex No. | Type | Conc. % on monomer | % Conversion when injected* | Mean Granule Size (μm) | Spread of 10-90% of material (μm) | Plasticiser Absorption % |
| C1 | — | — | — | 135 | 92 | 27.4 |
| 2 | 'Nansa' 1260 | 0.068 | 55 | 129 | 88 | 34.2 |
| C3 | 'Synperonic' A11 | 0.050 | 55 | 136 | 93 | 23.2 |
| C4 | 'Synperonic' A11 | 0.163 | 55 | 126 | 72 | 27.9 |
| C5 | 'Fluorad' FC 126 | 0.036 | 55 | 132 | 83 | 24.6 |
| C6 | — | — | — | 137 | 116 | 25.6 |
| 7 | 'Tal' 160T | 0.0635 | 40 | 137 | 100 | 36.0 |
| 8 | 'Synperonic' RA00/80 | 0.0452 | 40 | 133 | 103 | 32.8 |
| 9 | 'Tal' 160T | 0.0452 | 40 | 136 | 95 | 37.2 |
| C10 | — | — | — | 141 | 95 | 27.4 |
| 11 | 'Tal' 160T | 0.0452 | 25 | 127 | 94 | 39.7 |
| C12 | 'Synperonic' NP13 | 0.06 | 25 | 148 | 98 | 28.4 |
| C13 | 'Synperonic' A11 | 0.06 | 25 | 147 | 119 | 29.8 |
| C14 | 'Tetronic' 707 | 0.036 | 40 | 137 | 91 | 27.8 |

*Estimated according to the time lapsed, taking into account the time to and conversion at pressure drop.

In the above (and following) Examples, Cold Plasticiser Absorption is expressed as the percentage of plasticiser (dioctyl phthalate) absorbed into the polymer at room temperature after centrifuging for 1 hour at an acceleration strength of 8000 m sec$^{-2}$. A known quantity of polymer is weighed out into a metal tube with a hole in the bottom covered with cotton wool. A known volume of plasticiser (dioctyl phthalate) is added. The tube is then centrifuged for 1 hour at 8000 m sec$^{-2}$. The tube of polymer is then reweighed and the percentage dioctyl phthalate absorbed is determined.

It can be seen from Table 2 that the employment of those surfactants selected for use according to the invention (Examples 2, 7 to 9, 11) resulted in the production of vinyl chloride polymers having substantially unaltered granulometry in comparison to comparative polymers (Examples C1, C6, and C10) made without surfactant injection yet possessing significantly improved porosity (as determined by Cold Plasticiser Absorption). The employment of those surfactants not selected for use according to the invention (Examples C3 to C5, and C12 to C14) resulted in the production of vinyl chloride polymers exhibiting but a meagre (if any) enhancement of porosity.

EXAMPLES C15, 16 TO 18, C19, C20, 21

The same procedure as that of Examples 1 to 14 was used, although the basic recipe used was as follows:

| | |
|---|---|
| vinyl chloride | 80 kg |
| demineralised water | 126 liters |
| diethyl peroxydicarbonate (initiator) | 0.03% based on monomer |
| partially hydrolysed polyvinyl acetate (suspension agent) | 0.14% based on monomer (added before the start of polymerisation) |

The details of the polymerisations and the resulting polymer properties are shown in Table 3.

It can be seen that the utility of the process of the invention is again readily apparent from the results given in Table 3.

EXAMPLES C22, C23, 24 TO 29, C30

The same procedure and basic recipe as used in Examples 15-21 were employed. The details of the polymerisations and the resulting polymer properties are shown in Table 4.

It is seen that the effective conversion range for surfactant injection according to the invention (from the viewpoint of unaffected granulometry and significant porosity increase) is about 15 to 65%.

TABLE 4

| | Injected Surfactant | | % Conversion when injected* | Polymer Properties | | |
|---|---|---|---|---|---|---|
| Ex No. | Type | Conc. % on monomer | | Mean Granule Size (μm) | Granule size Spread of 15-85% of material (μm) | Cold Plasticiser Absorption % |
| C22 | — | — | — | 142 | 78 | 30.3 |
| C23 | 'Tal' 160T | | 0 | 66 | 45 (partly solid batch) | 38.6 |
| 24 | 'Tal' 160T | | 15 | 123 | 78 | 37.1 |
| 25 | 'Tal' 160T | | 55 | 145 | 73 | 34.8 |
| 26 | 'Tal' 160T | | 70 | 144 | 73 | 27.2 |
| 27 | 'Nansa' 1260 | 0.05 | 17 | 127 | 76 | 37.9 |
| 28 | 'Nansa' 1260 | 0.05 | 35 | 149 | 87 | 42.1 |
| 29 | 'Nansa' 1260 | 0.05 | 52 | 149 | 79 | 33.4 |
| C30 | 'Nansa' 1260 | 0.05 | 67 | 140 | 80 | 29.6 |

*Estimated according to the time lapsed, taking into account the time to and conversion at pressure drop.

We claim:

1. A process for the production of a vinyl chloride polymer of high porosity and plasticiser absorption capacity which process comprises polymerising vinyl chloride in aqueous suspension in the presence of a suspension agent that is present in the polymerisation medium at the start of polymerisation and a free-radical yielding initiator wherein an effective surfactant which lowers the interfacial tension between 1,2-dichloroethylene and water to $\leq 8$ dynes cm$^{-1}$ (as measured at 20° C. on an aqueous surfactant solution containing 0.1% w/v surfactant) is injected into the polymerisation medium at a conversion of monomer to polymer within the range 15 to 65%.

2. A process according to claim 1 wherein the surfactant is injected at a conversion of 20 to 55%.

3. A process according to claim 1 wherein the suspension agent used is a partially hydrolysed polyvinyl acetate or a cellulose derivative.

4. A process according to claim 1 wherein the initiator used is a dialkyl or dicycloalkyl peroxydicarbonate whose alkyl or cycloalkyl radicals contain up to 20 carbon atoms.

5. A process according to claim 1 which comprises vinyl chloride polymerisation to produce a polymer containing at least 50% molar of units derived from vinyl chloride.

* * * * *

TABLE 3

| | Injected Surfactant | | % Conversion when injected* | Polymer Properties | | |
|---|---|---|---|---|---|---|
| Ex No. | Type | Conc. % on monomer | | Mean Granule Size (μm) | Granule size Spread of 15-85% of material (μm) | Cold Plasticiser Absorption % |
| C15 | — | — | — | 145 | 75 | 28.7 |
| 16 | 'Synprolam' 35 × 2/HCl | 0.05 | 40 | 143 | 75 | 34.2 |
| 17 | 'Tal' 160T | 0.05 | 35 | 149 | 77 | 42.0 |
| 18 | 'Tal' 160T | 0.025 | 35 | 151 | 79 | 35.2 |
| C19 | 'Synperonic' NP20 | 0.05 | 35 | 150 | 79 | 30.7 |
| C20 | — | — | — | 135 | 74 | 30.8 |
| 21 | 'Cetavlon' | 0.05 | 35 | 145 | 83 | 41.4 |

*Estimated according to the time lapsed, taking into account the time to and conversion at pressure drop.